US008702081B2

(12) United States Patent
Melchior

(10) Patent No.: US 8,702,081 B2
(45) Date of Patent: Apr. 22, 2014

(54) CLAMPING DEVICE FOR CLAMPING A PLURALITY OF WORKPIECES AT PREDETERMINED ANGLES

(76) Inventor: Karl C. S. Melchior, Nova Scotia (CA)

( * ) Notice: Subject to any disclaimer, the term of this patent is extended or adjusted under 35 U.S.C. 154(b) by 0 days.

(21) Appl. No.: 13/408,042

(22) Filed: Feb. 29, 2012

(65) Prior Publication Data

US 2013/0221593 A1 Aug. 29, 2013

(51) Int. Cl.

| | |
|---|---|
| ***B25B 5/14*** | (2006.01) |
| ***B23Q 3/02*** | (2006.01) |
| ***B23P 19/04*** | (2006.01) |
| ***B23B 31/08*** | (2006.01) |
| *B25B 5/16* | (2006.01) |

(52) U.S. Cl.
USPC .............. 269/107; 269/133; 29/261; 279/141

(58) Field of Classification Search
USPC ............ 269/107, 133; 29/261, 283, 133, 262, 29/246; 279/141, 142, 106
See application file for complete search history.

(56) References Cited

U.S. PATENT DOCUMENTS

| | | | | |
|---|---|---|---|---|
| 1,446,918 | A * | 2/1923 | Mielke | 29/261 |
| 1,552,476 | A * | 9/1925 | Erickson et al. | 219/142 |
| 1,682,956 | A * | 9/1928 | Dawson et al. | 29/246 |
| 2,482,338 | A | 9/1949 | Hall | |
| 2,605,795 | A * | 8/1952 | Tracy | 269/133 |
| 3,069,181 | A * | 12/1962 | Hohwart et al. | 279/106 |
| 3,503,398 | A * | 3/1970 | Raible et al. | 606/207 |
| 4,821,393 | A * | 4/1989 | Spigarelli | 29/283 |
| 5,224,254 | A * | 7/1993 | McPeak et al. | 29/261 |
| 5,481,951 | A * | 1/1996 | Kiefer | 82/162 |
| 5,557,833 | A * | 9/1996 | Pool | 29/261 |
| 5,728,121 | A * | 3/1998 | Bimbo et al. | 606/207 |
| 5,820,137 | A * | 10/1998 | Patterson | 279/141 |
| 5,843,101 | A * | 12/1998 | Fry | 606/157 |
| 6,126,174 | A * | 10/2000 | Reece et al. | 279/2.24 |
| 6,273,902 | B1 * | 8/2001 | Fogarty et al. | 606/207 |
| 6,308,597 | B1 * | 10/2001 | Stahle | 81/319 |
| 6,382,608 | B1 * | 5/2002 | Michell | 269/6 |
| 6,665,919 | B1 * | 12/2003 | Kurtz et al. | 29/262 |
| 6,745,441 | B1 * | 6/2004 | Lin | 24/505 |
| 6,860,179 | B2 * | 3/2005 | Hopper et al. | 81/318 |
| 7,201,204 | B2 * | 4/2007 | Corghi et al. | 157/16 |
| 7,204,493 | B1 * | 4/2007 | Gatton | 279/106 |
| 7,954,825 | B2 * | 6/2011 | Crowley et al. | 279/124 |
| 2002/0049470 | A1 * | 4/2002 | Fogarty et al. | 606/205 |
| 2002/0111650 | A1 * | 8/2002 | Fogarty et al. | 606/207 |
| 2005/0166405 | A1 * | 8/2005 | Lai | 30/229 |

* cited by examiner

*Primary Examiner* — Alvin Grant
(74) *Attorney, Agent, or Firm* — Thompson Hine L.L.P.

(57) ABSTRACT

A clamping device having at least three jaws for clamping a plurality of elongated workpieces with the workpieces forming predetermined angles therebetween. Each of at least two jaws has clamping surfaces that are oriented to correspond to a respective angle. Each of the at least two jaws is connected to a first endportion of a respective arm. A holding element has the at least two arms pivotally movable mounted thereto such that the at least two jaws are movable between an open position for placing the clamping device and a clamping position for clamping the workpieces. An actuator is connected to the at least two arms for moving the at least two arms and for holding the at least two arms in the clamping position.

16 Claims, 18 Drawing Sheets

CLAMPING DEVICE FOR CLAMPING A PLURALITY OF WORKPIECES AT PREDETERMINED ANGLES

FIELD

The present invention relates to hand tools, and more particularly to a clamping device for clamping a plurality of workpieces with the workpieces forming predetermined angles therebetween.

BACKGROUND

In numerous trades such as, for example, carpentry, iron work, sheet metal processing, and plumbing, it is necessary to join two or more elongated workpieces with the workpieces forming predetermined angles therebetween.

Typically, the workpieces are placed on the top surface of a workbench, properly oriented to form predetermined angles therebetween, and then clamped to the workbench using, for example, C-clamps. To facilitate the orientation of the workpieces, fences oriented at corresponding angles are sometimes mounted to the workbench. Still, this is a tedious process and prone to introducing inaccuracies in the orientation of the workpieces during the clamping process.

To more accurately holding workpieces at 90° angles, multi purpose clamps are used with a jaw for moving and holding a workpiece against a fence. Alternatively, picture frame clamps with two jaws are used. Unfortunately, both types of clamps are only employable for a very limited range of widths of the workpieces and impede access to the joint of the clamped workpieces. Furthermore, clamping of the workpieces is still a tedious process.

It is desirable to provide a clamping device for accurately clamping a plurality of workpieces with the workpieces forming predetermined angles therebetween.

It is also desirable to provide a clamping device for accurately clamping a plurality of workpieces that enables a simple and fast clamping process.

It is also desirable to provide a clamping device for accurately clamping a plurality of workpieces that enables access to the joint of the clamped workpieces.

It is also desirable to provide a clamping device for accurately clamping a plurality of workpieces that is employable for a wide range of widths of the workpieces.

SUMMARY

Accordingly, one object of the present invention is to provide a clamping device for accurately clamping a plurality of workpieces with the workpieces forming predetermined angles therebetween.

Another object of the present invention is to provide a clamping device for accurately clamping a plurality of workpieces that enables a simple and fast clamping process.

Another object of the present invention is to provide a clamping device for accurately clamping a plurality of workpieces that enables access to the joint of the clamped workpieces.

Another object of the present invention is to provide a clamping device for accurately clamping a plurality of workpieces that is employable for a wide range of widths of the workpieces.

According to one aspect of the present invention, there is provided a clamping device comprising at least three jaws for clamping a plurality of elongated workpieces with the workpieces forming predetermined angles therebetween. Each of at least two jaws comprises clamping surfaces that are oriented to correspond to a respective angle. Each of the at least two jaws is connected to a first endportion of a respective arm. A holding element has the at least two arms pivotally movable mounted thereto such that the at least two jaws are movable between an open position for placing the clamping device and a clamping position for clamping the workpieces. An actuator is connected to the at least two arms for moving the at least two arms and for holding the at least two arms in the clamping position.

According to one aspect of the present invention, there is provided a clamping device comprising at least three jaws for clamping a plurality of elongated workpieces with the workpieces forming predetermined angles therebetween. Each of the at least three jaws comprises clamping surfaces that are oriented to correspond to a respective angle. Each of the at least three jaws is connected to a first endportion of a respective arm. A holding element has the at least three arms pivotally movable mounted thereto such that the at least three jaws are movable between an open position for placing the clamping device and a clamping position for clamping the workpieces. An actuator is connected to the at least three arms for moving the at least three arms and for holding the at least three arms in the clamping position.

One advantage of the present invention is that it provides a clamping device for accurately clamping a plurality of workpieces with the workpieces forming predetermined angles therebetween.

A further advantage of the present invention is that it provides a clamping device for accurately clamping a plurality of workpieces that enables a simple and fast clamping process.

A further advantage of the present invention is that it provides a clamping device for accurately clamping a plurality of workpieces that enables access to the joint of the clamped workpieces.

A further advantage of the present invention is that it provides a clamping device for accurately clamping a plurality of workpieces that is employable for a wide range of widths of the workpieces.

BRIEF DESCRIPTION OF THE DRAWINGS

One embodiment of the present invention is described below with reference to the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

Figure 1A:
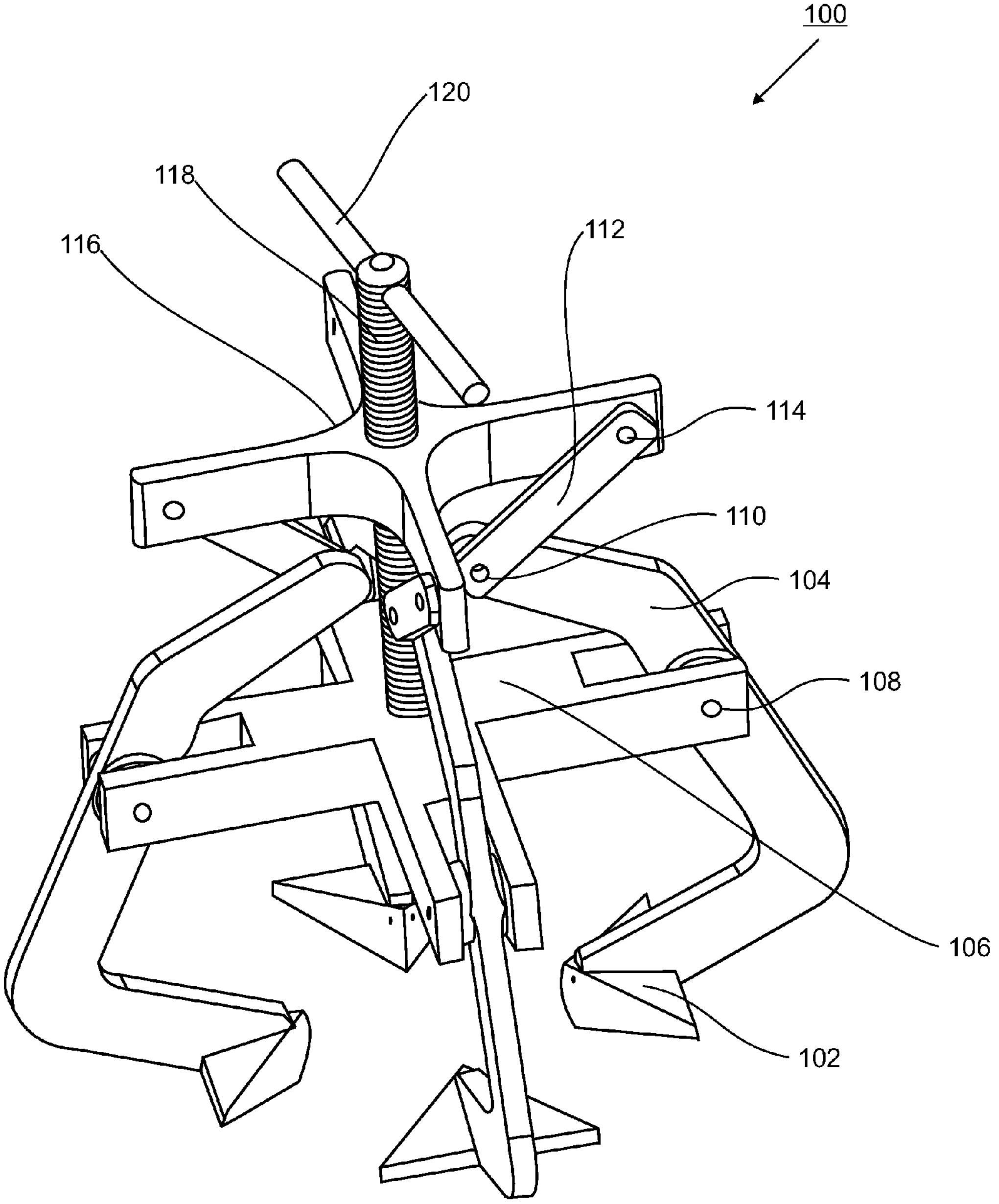
FIG. 1*a* is a simplified block diagram illustrating a perspective view of a clamping device according to one embodiment of the invention.
Figure 1B:
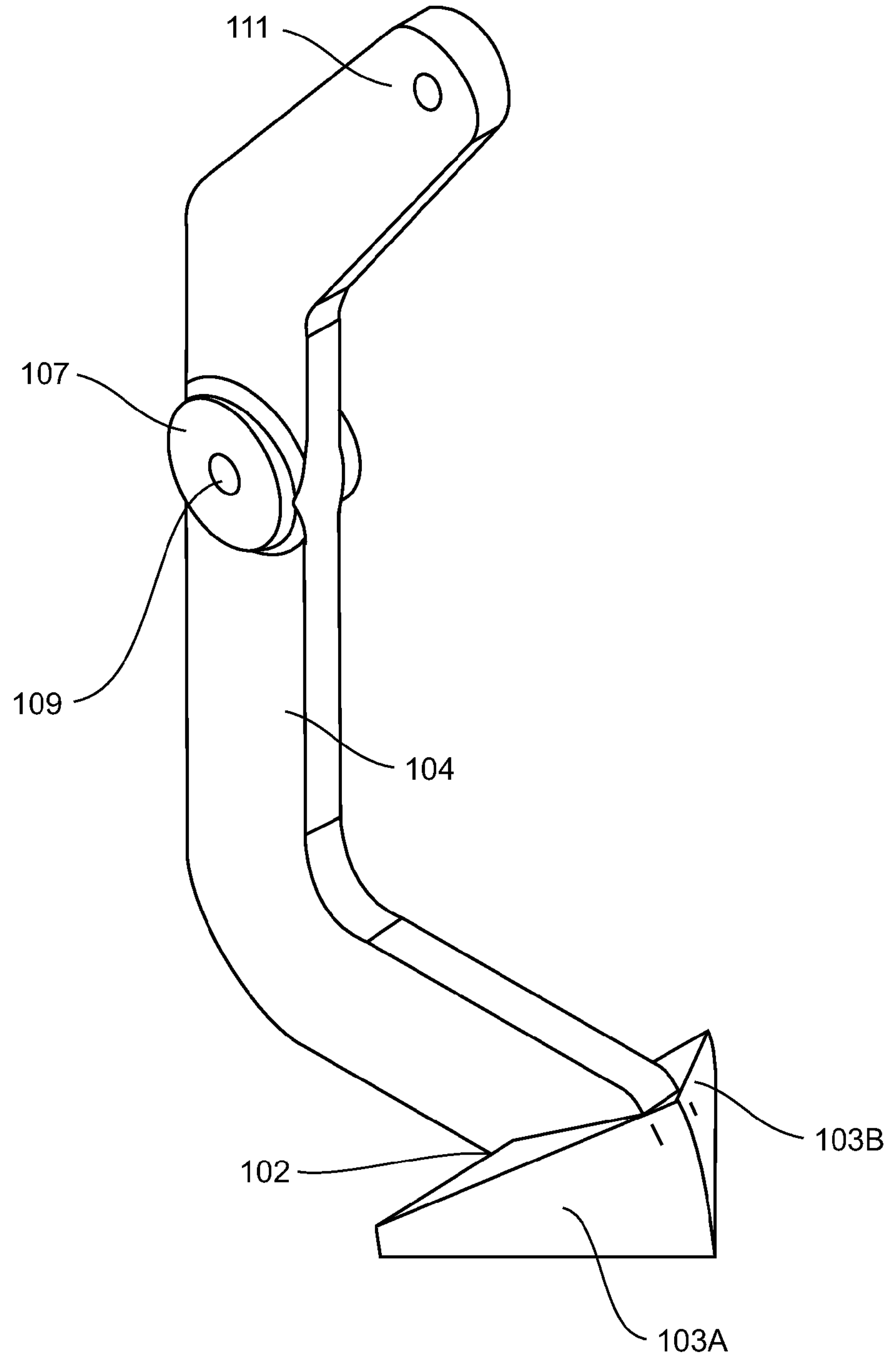
FIGS. 1*b* to 1*e* are a simplified block diagrams illustrating perspective views of an arm, a holding element, an actuator element, and a screw shaft, respectively, of the clamping device according to one embodiment of the invention.
Figure 1C:
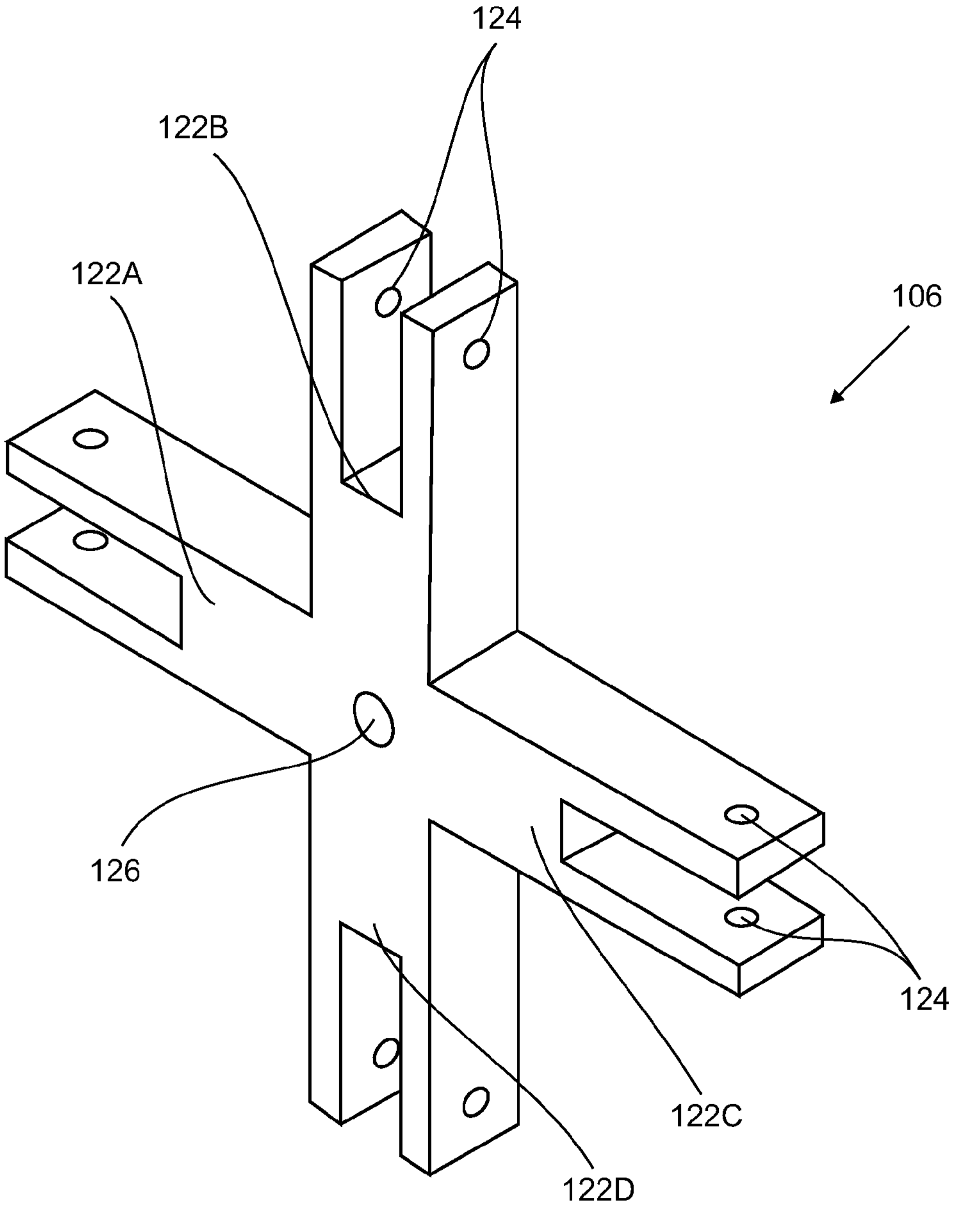
Figure 1D:
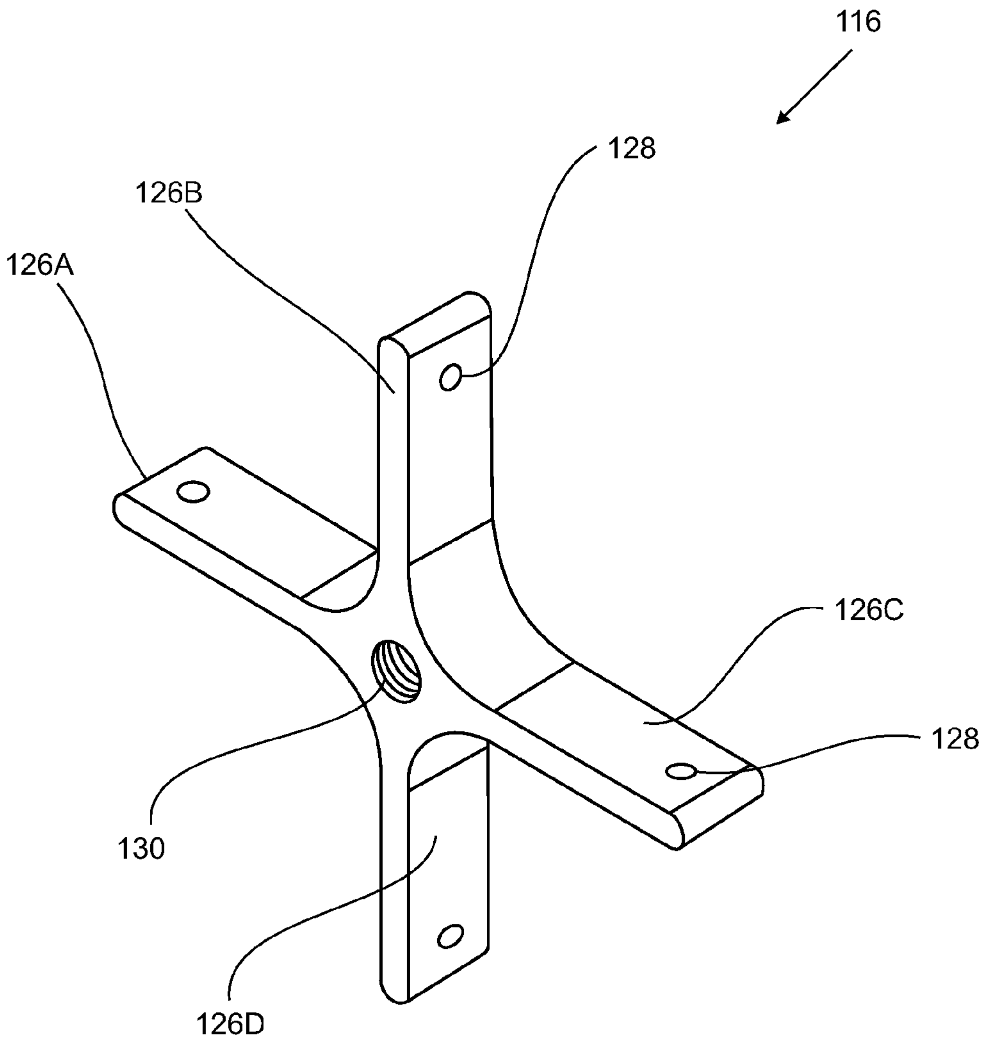
Figure 1E:
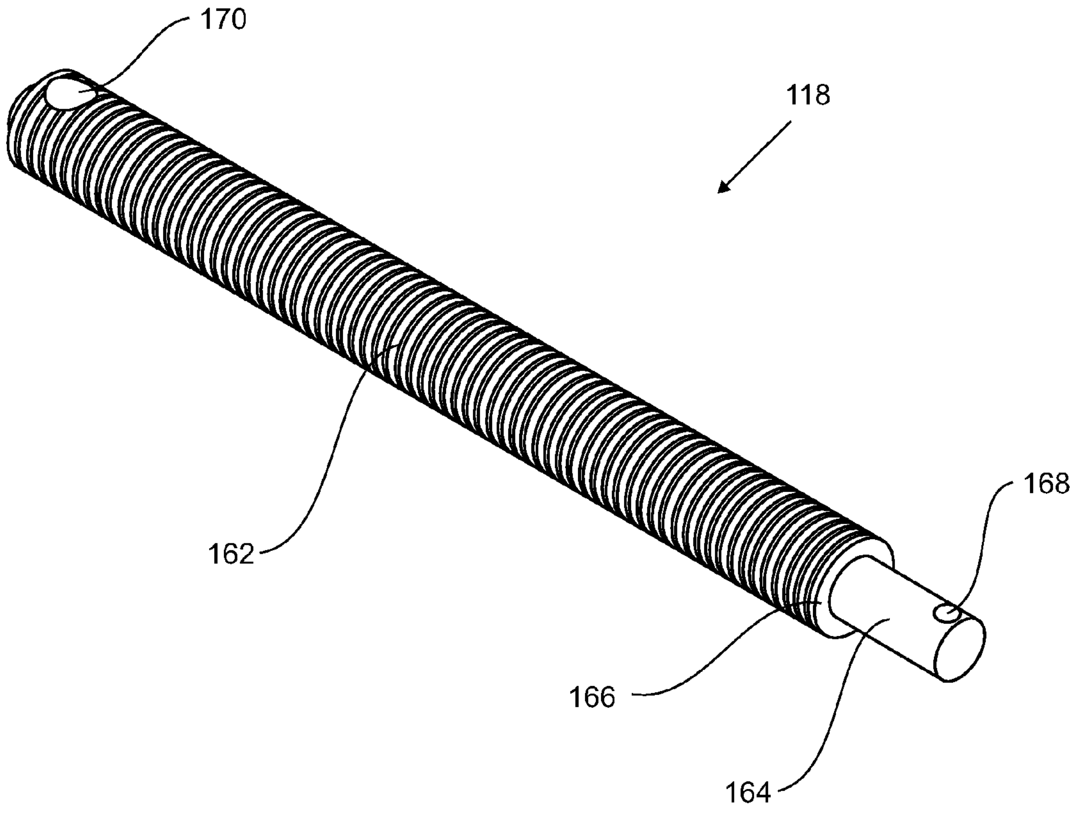

Referring to FIGS. 1*a* to 1*d*, a clamping device 100 according to one embodiment of the invention is provided. The clamping device 100 comprises four jaws 102 for clamping a plurality of workpieces with the workpieces forming angles of 90° therebetween. Each of the four jaws 102 comprises two clamping surfaces 103A, 103B oriented to correspond to a respective angle, as illustrated in FIG. 1*b*. Each of the four jaws 102 are connected to a first endportion of a respective arm 104, which can be substantially C-shaped. The arm 104 further comprises a bore 111 disposed at a second endportion and a bore 109 disposed at a midportion thereof. Each arm 104 is pivotally movable mounted at pivot 108 to a respective U-shaped section 122A, 122B, 122C, 122D of holding element 106 in a conventional manner, using, for example, a bolt accommodated in respective bores 109 of the arms 104 and the in bores 124 of the holding element 106 and having a threaded endportion for securing the same with a respective screw nut.

The arm 104 may comprise protrusion 107 to extend the length of the bore 107 for improving accuracy of the pivotal movement of the arm 104 between an open position for placing the clamping device 100 and a clamping position for clamping the workpieces.

The clamping device 100 further comprises an actuator connected to the arms 104 for moving the arms 104 and for holding the arms 104 in the clamping position. In one case the actuator comprises actuator element 116 having four actuator sections 126A, 126B, 126C, and 126D for being connected to respective arms 104 via coupling elements 112. Each coupling element 112 is pivotally movable mounted to the actuator element 116 at pivot 114 and pivotally movable mounted at pivot 110 to a second endportion of the respective arm 104 in a conventional manner, for example, using: a first bolt accommodated in respective bores 111 of the arms 104 and bores disposed in a first endportion of the coupling elements 112; and, a second bolt accommodated in respective bores 128 of the actuator sections 126A, 126B, 126C, and 126D and bores disposed in a second endportion of the coupling elements 112. The bolts have, for example, a threaded endportion for securing the same with a respective screw nut. Screw shaft 118 can comprise a threaded portion 162, which is accommodated in threaded bore 130 disposed at the center of the actuator element 116, and an un-threaded endportion 164, which is accommodated in bore 126 of the holding element 106. The screw shaft 118 is rotatable secured to the holding element 106 via abutting surface 166 and a bolt disposed in bore 168. Optionally, a washer is disposed between the abutting surface 166 and the holding element 106 as well as between the bolt disposed in the bore 168 and the holding element 106. Bore 170 accommodates handle 120 therein for enabling manual operation of the clamping device 100 by rotating the screw shaft 118.

The various components of the clamping device can be made of a metal such as, for example, steel or aluminum using standard manufacturing technologies such as, for example, casting, drilling, etc. Alternatively, a suitable plastic material is employed such as, for example, a polyamide of sufficient material strength using standard molding techniques. The clamping device 100 is employable in various sizes depending on the sizes of the workpieces to be clamped.

Alternatively, the actuator comprises a cam-type mechanism acting on the second endportion of each of the arms 104. Further, alternatively, the second endportion of each of the arms 104 is pivotally movable mounted to the holding element 106 and the actuator is connected to the midportion of each of the arms 104.

Figure 2A:
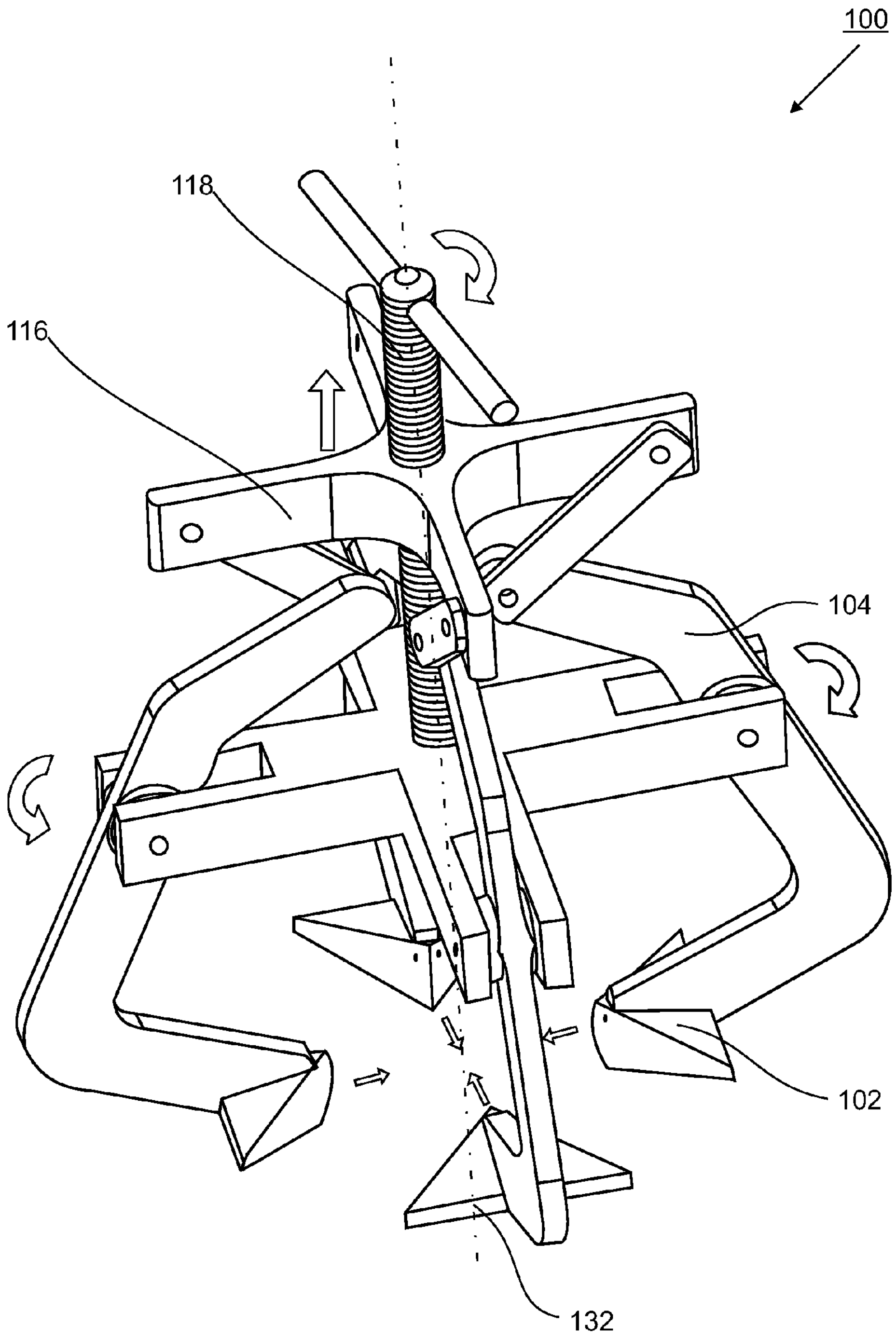
FIG. 2*a* is a simplified block diagram illustrating a perspective view of the clamping device according to one embodiment of the invention in operation.

Rotation of the screw shaft 118 changes the distance between the actuator element 116 and the holding element 106. For example, as illustrated by the arrows in FIG. 2*a*, the actuator element 116 is moved in an upward direction pulling the second endportion of the arms 104 in an upward and outward direction, thus rotating the arms 104 and moving the jaws 102 in an inward direction from the open position for placing the clamping device 100 to the clamping position for clamping the workpieces.

Figure 2B:
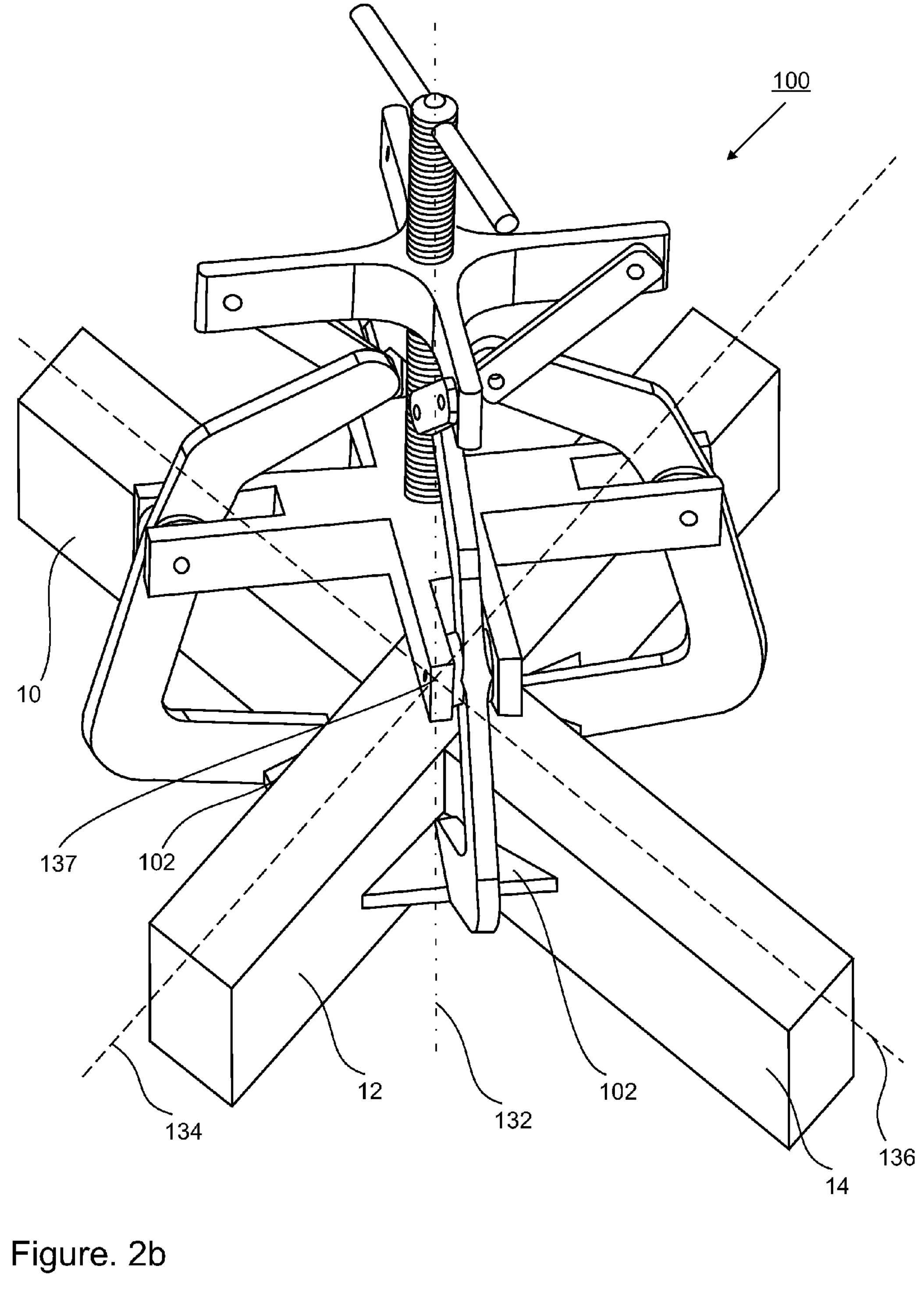
FIGS. 2*b* and 2*c* are simplified block diagrams illustrating a perspective view and a bottom view, respectively, of the clamping device according to one embodiment of the invention in the clamping position.
Figure 2C:
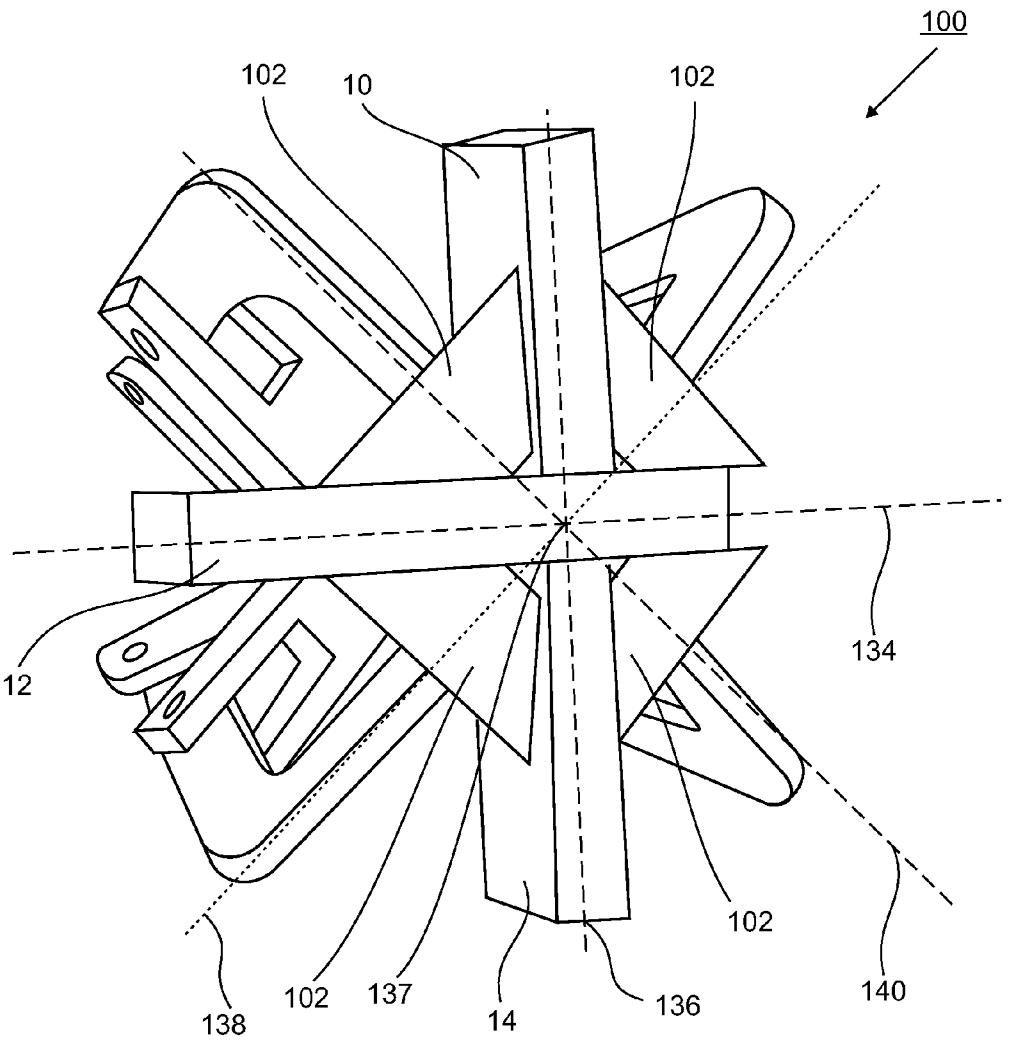

In one case the four jaws 102 are movable towards a center location 137 with the center location 137 being on a longitudinal axis 132 of the screw shaft 118, as illustrated in FIGS. 2*b* and 2*c*. The four jaws 102 may also be movable in a plane through a respective angle bisector 138, 140. As illustrated in FIG. 2*b*, the center location 137 then substantially coincides with an intersection of centerlines 134 and 136 of the workpieces 10, 12, and 14 in the clamping position.

Figure 3A:
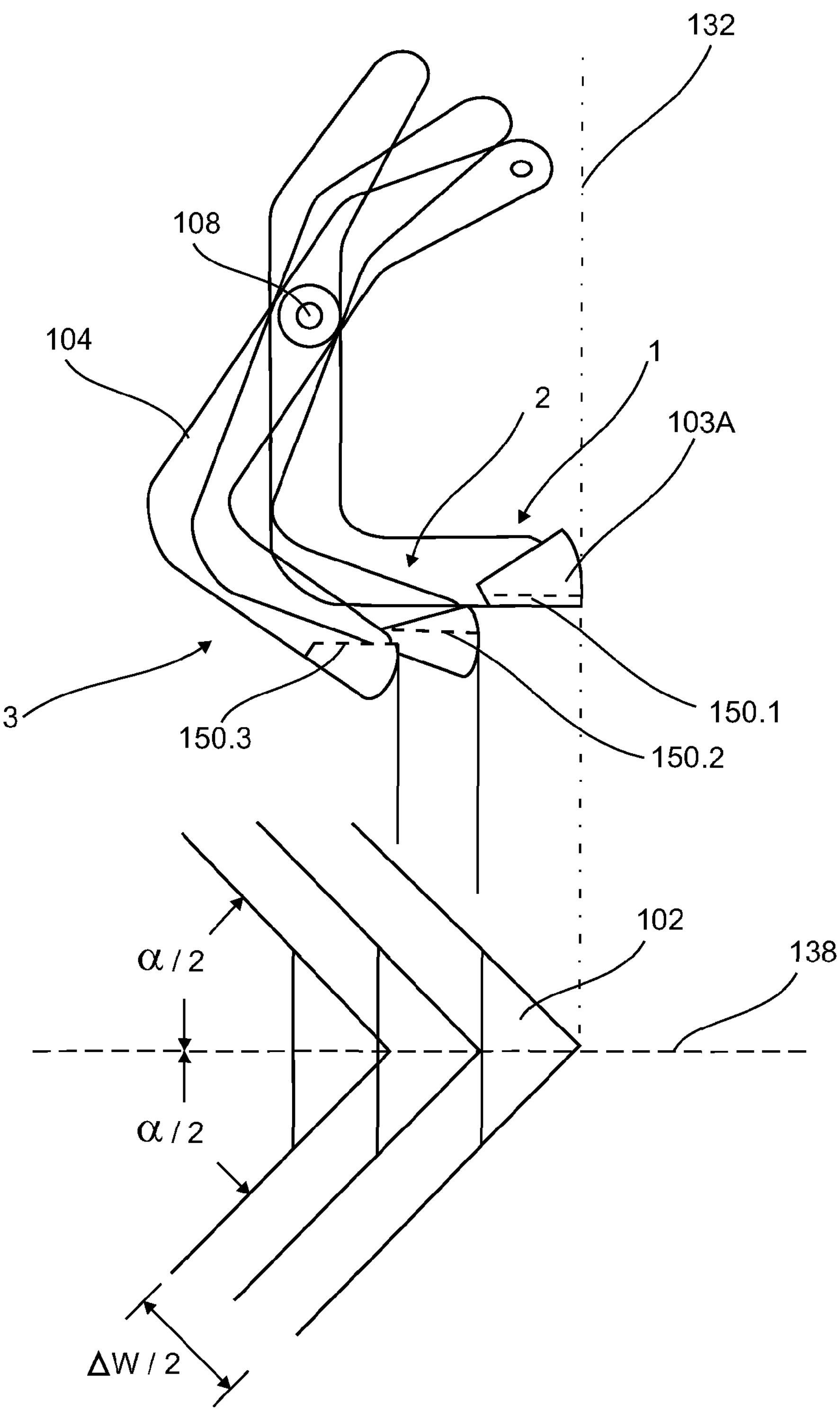
FIG. 3*a* is a simplified block diagram illustrating a side view and a bottom view of an arm with a jaw of the clamping device according to one embodiment of the invention in a clamping position for different widths of the workpieces.
Figure 3B:
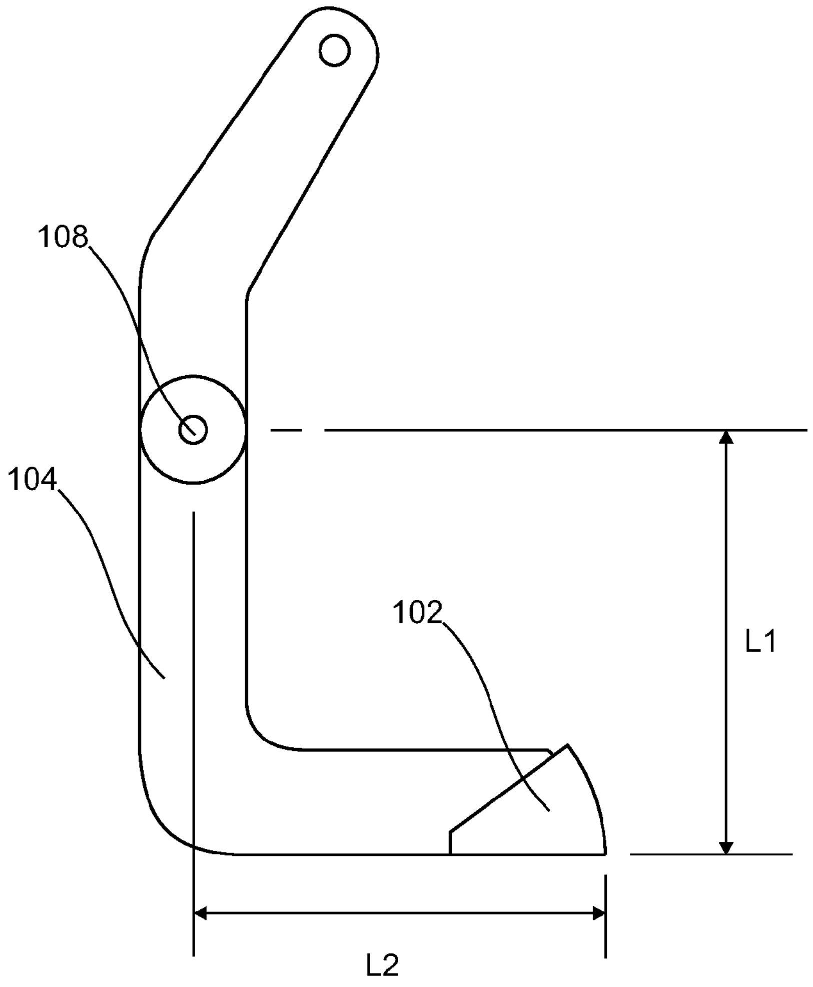
FIG. 3*b* is a simplified block diagram illustrating a side view of the arm with the jaw of the clamping device according to one embodiment of the invention.

In carpentry and iron work it is common to join workpieces having a rectangular cross section. In order to enable proper clamping of such workpieces for a wide range of different widths of the workpieces—starting, for example, with sheet metal—the jaws 102 of the clamping device 100 comprise convex curved surfaces 103A, 103B. The convex curved surfaces 103A, 103B are determined such that—within a predetermined range of widths of the workpieces, i.e. an operating range of the clamping device 100—the curved surfaces 103A, 103B tangentially interact with a plane surface of the respective workpiece, i.e. along an interaction line. FIG. 3*a*, illustrates in a side view of an arm 104 with a jaw 102 in a plane through the bisector 138 of angle α for three different clamping positions 1, 2, 3, of the jaw 102 corresponding to three different widths of the workpieces, illustrated in the corresponding bottom view. For example, for clamping thin workpieces such as sheet metal the jaw 102 is in position 1 interacting with the workpiece along line 150.1. With increasing width of the workpieces the jaw 102 is placed outward to positions 2 and then 3 for clamping and the respective interaction lines 150.2 and 150.3 are moved up on the clamping surface 103A. Thus, clamping of workpieces of different widths in the range of ΔW is enabled. The shape of the clamping surfaces 103A, 103B is determined using standard engineering methods based on the geometry of the arm 104 such as, for example, lengths L1 and L2, as illustrated in FIG. 3*b*, the predetermined range of widths ΔW of workpieces to be clamped and the angle α.

Figure 4A:
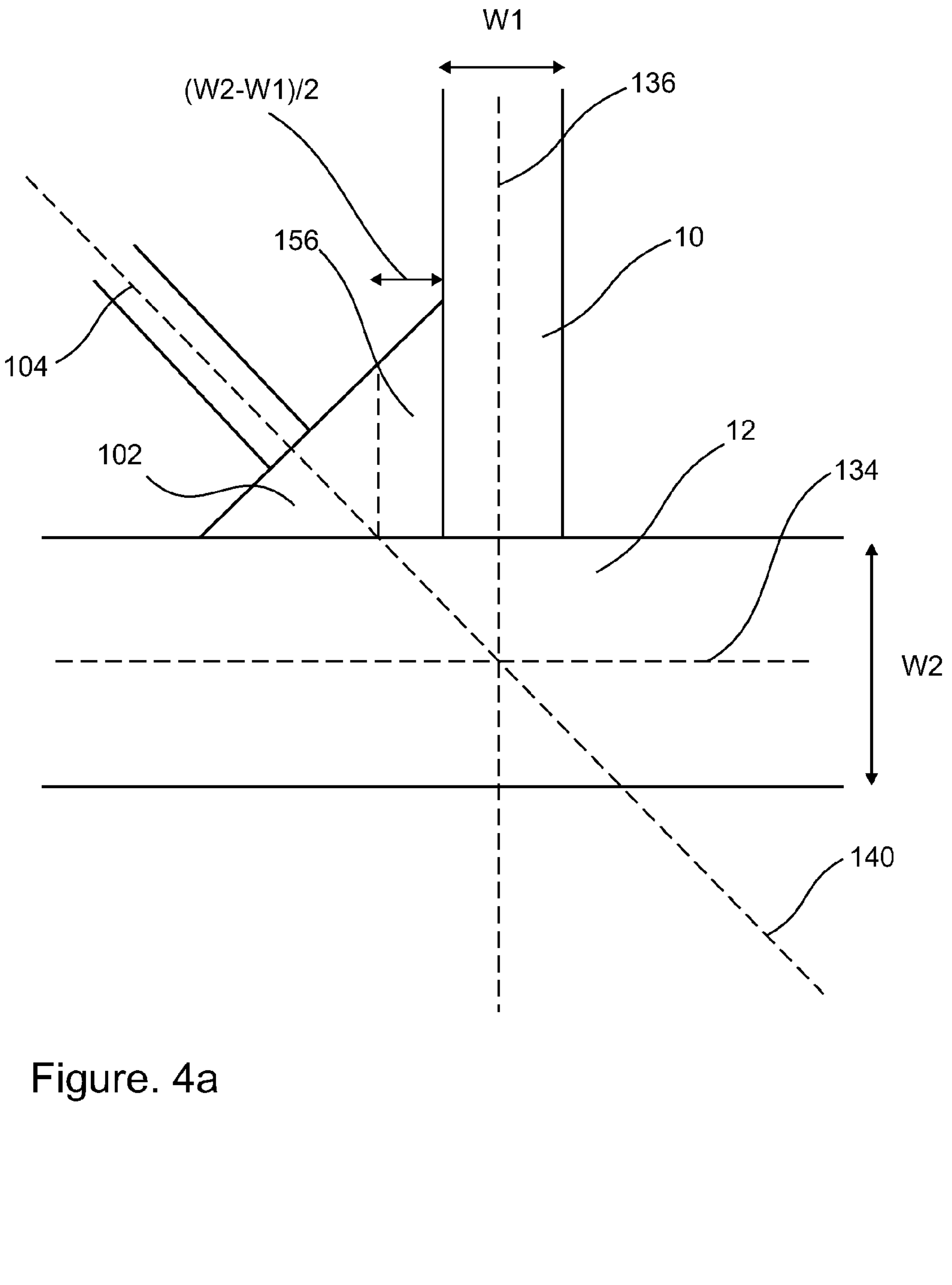
FIGS. 4*a* and 4*b* are simplified block diagrams illustrating a bottom view of different jaws of the clamping device according to one embodiment of the invention.

Referring to FIG. 4*a*, clamping of a first workpiece having a first width with a second workpiece having a second different width is illustrated in a bottom view of one sector for the sake of simplicity. In order to account for the difference in width between the width W1 of the first workpiece 10 and the width W2 of the second workpiece 12, the jaw 102 moved along bisector 140 comprises jaw extension 156—extending the jaw 102 by (W2−W1)/2 towards the first workpiece 10—for properly clamping the same. Similarly, a jaw 102 disposed on the opposite side (not shown) also comprises a jaw extension of (W2−W1)/2 towards the workpiece 10.

Figure 4B:
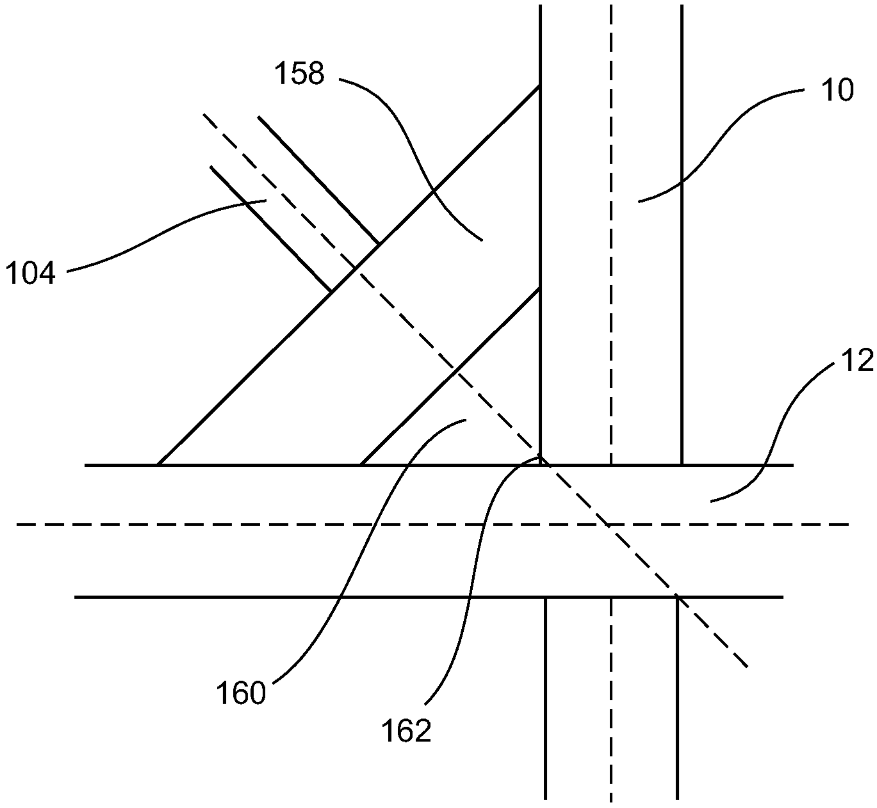
Figure 5A:
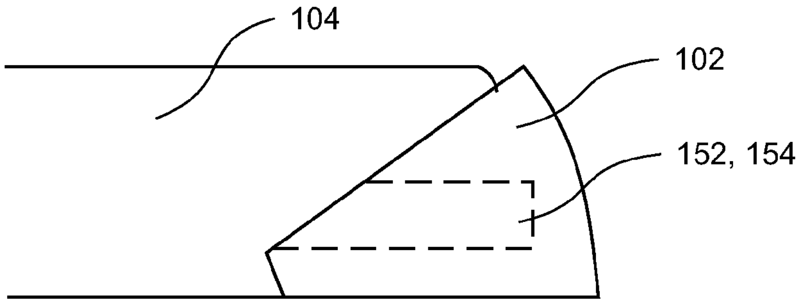
FIG. 5*a* is a simplified block diagram illustrating a side view of an arm with a removable mounted jaw of the clamping device according to one embodiment of the invention.
Figure 5B:
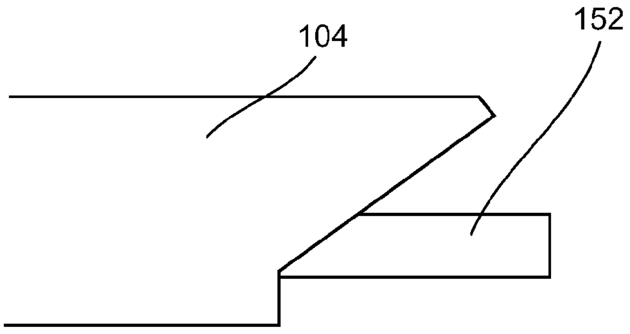
FIGS. 5*b* and 5*c* are simplified block diagrams illustrating a side view and a front view, respectively, of an arm with a connecting element for being mated with a respective connecting element of a jaw of the clamping device according to one embodiment of the invention.
Figure 5C:
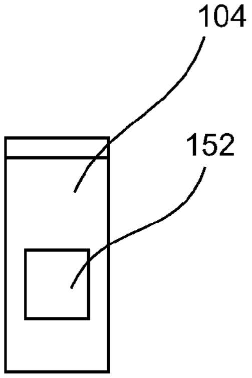
Figure 5D:
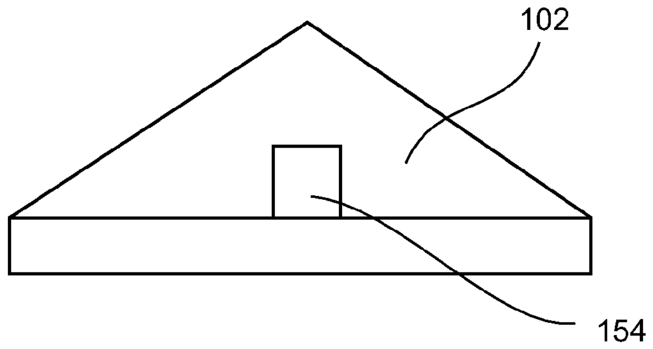
FIG. 5*d* is a simplified block diagram illustrating a rear view of a jaw with a connecting element for being mated with a respective connecting element of an arm of the clamping device according to one embodiment of the invention.

Optionally, the jaws 102 are replaced by truncated jaws 158, as illustrated in FIG. 4*b*, enabling access to space 160 in proximity to the joint, for example, for welding in the corner 162 between the workpieces 10 and 12.

Further optionally, the jaws 102 comprise plane interacting surfaces or concave curved interacting surfaces for clamping round workpieces such as pipes.

Further optionally, the jaws 102 are removable mounted to the respective arms 104 to increase the flexibility of the clamping device 100 by enabling exchange of different types of jaws such as illustrated, for example, in FIGS. 4*a* and 4*b*. For example, a connecting mechanism comprises a male connecting element 152 disposed on the jaw 104 and a female connecting element 154 for accommodating the male connecting element 152 therein, as illustrated in FIGS. 4*a* to 4*d*. The connecting elements 152 and 154 have a cross section that ensures proper angular orientation of the jaw 102 when mounted to the respective arm 104 such as, for example, a rectangular cross section, a triangular cross section or a hexagonal cross section. The jaw 102 is secured to the respective arm 104 using, for example, a snug fit with the connecting elements 152 and 154 being tapered.

Figure 6A:
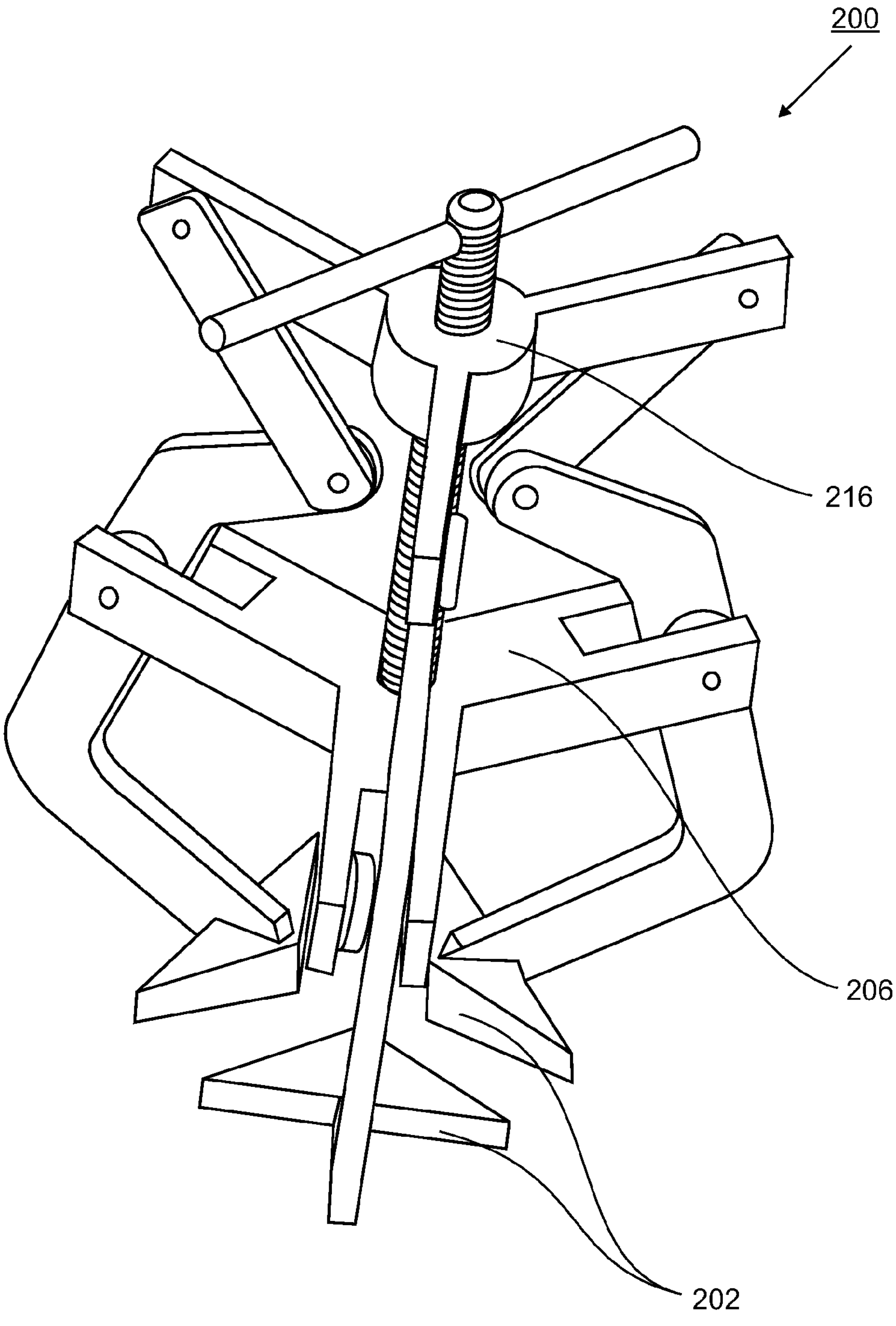
FIG. 6*a* is a simplified block diagram illustrating a perspective view of a clamping device according to another embodiment of the invention.

Of course the design of the clamping device is not limited to four jaws 102 for clamping the workpieces at 90° angles as illustrated hereinabove. For example, the clamping device is easily redesigned for clamping various numbers of workpieces at various angles by changing the jaws 102, the holding element 106, and the actuator element 116 to account for different angles. For example, the clamping device 200, illustrated in FIG. 6*a*, comprises three jaws 202 for clamping three workpieces at 120° angles with holding element 206 and actuator element 216 each having three sections oriented at 120° angles to each other. As is evident, there are numerous design options for enabling clamping of various numbers of workpieces at various angles, as well as combinations of different angles in one clamping device.

Figure 6B:
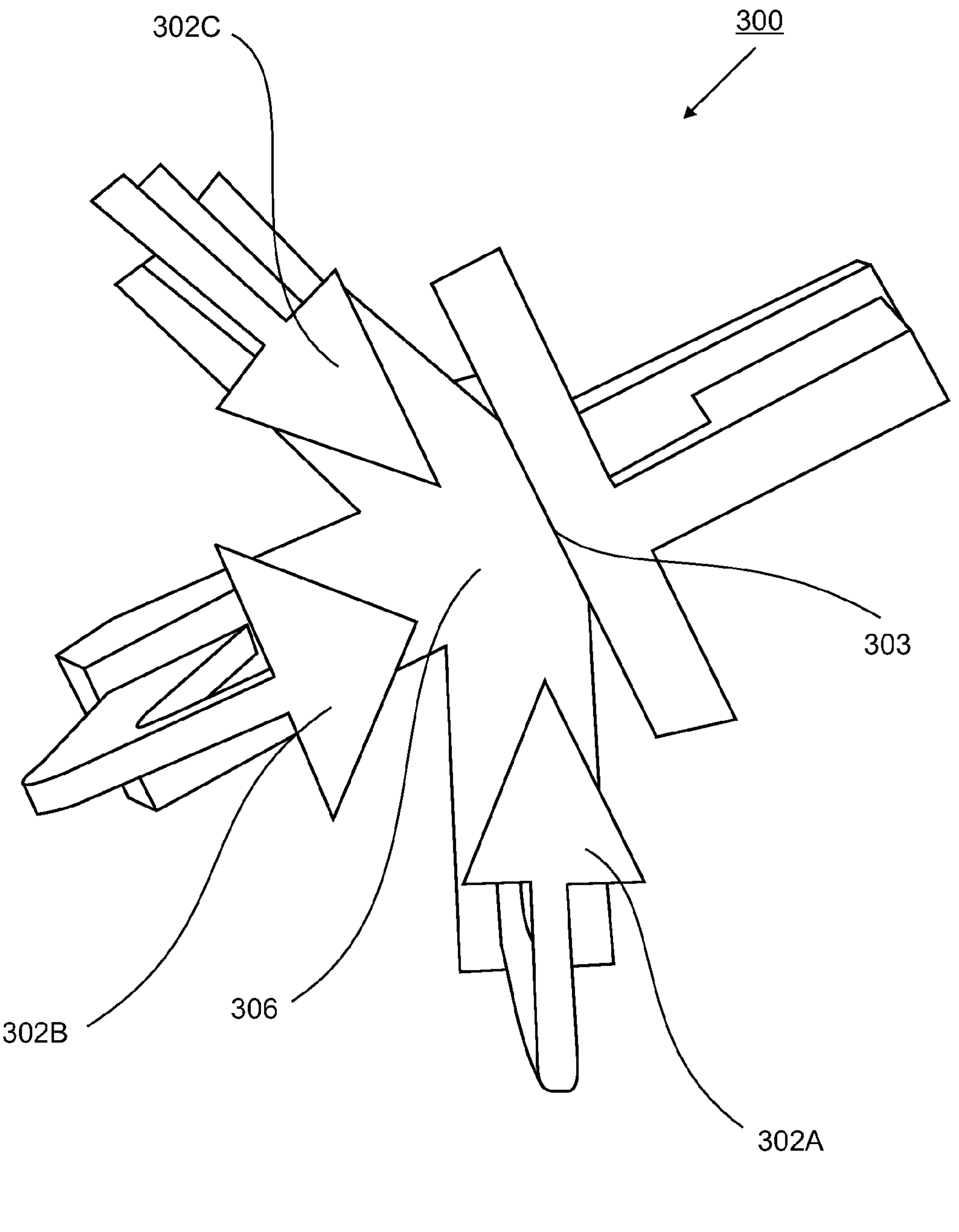
FIGS. 6*b* and 6*c* are simplified block diagrams illustrating a perspective view and a bottom view, respectively, of a clamping device according to yet another embodiment of the invention.
Figure 6C:
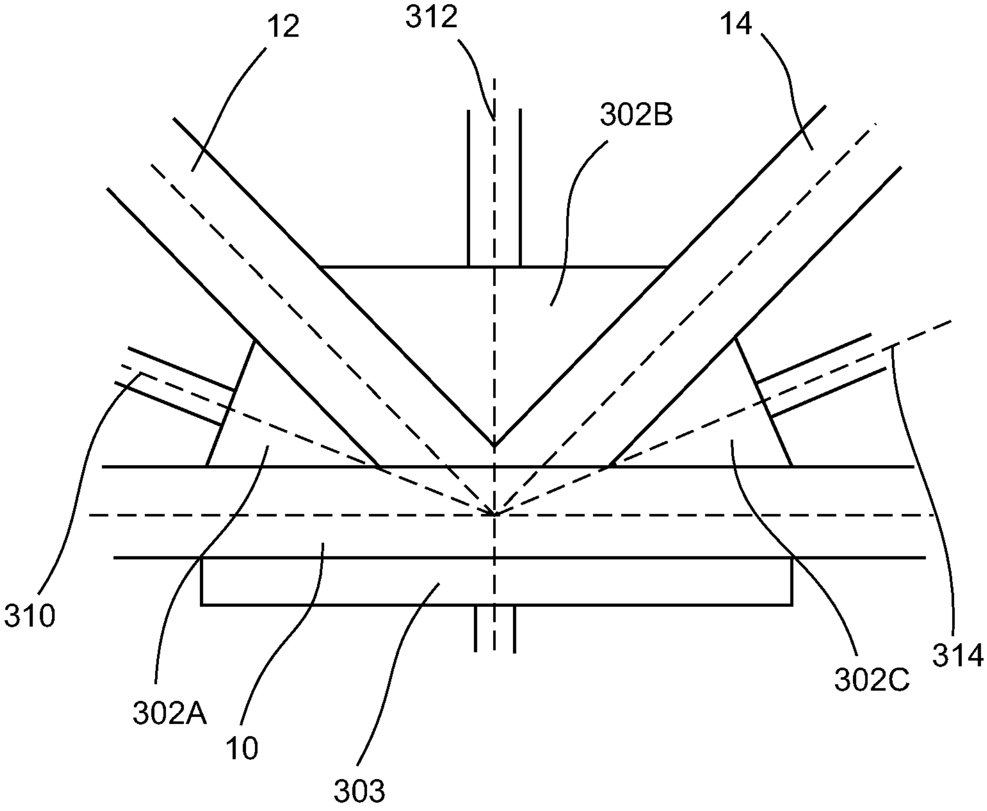

Referring to FIGS. 6*b* and 6*c*, a clamping device 300 according to another embodiment of the invention is provided. Here jaw 303 is fixedly connected to the holding element 306 and forms a fence for abutting workpiece 10. Workpieces 12 and 14 are then clamped thereto at predetermined angels—of 45° and 90°—by jaws 302A, 302B, and 302C which are movable in planes through bisectors 310, 312, and 314, respectively. As is evident, there are numerous design options for enabling clamping of various numbers of workpieces at various angles.

Figure 6D:
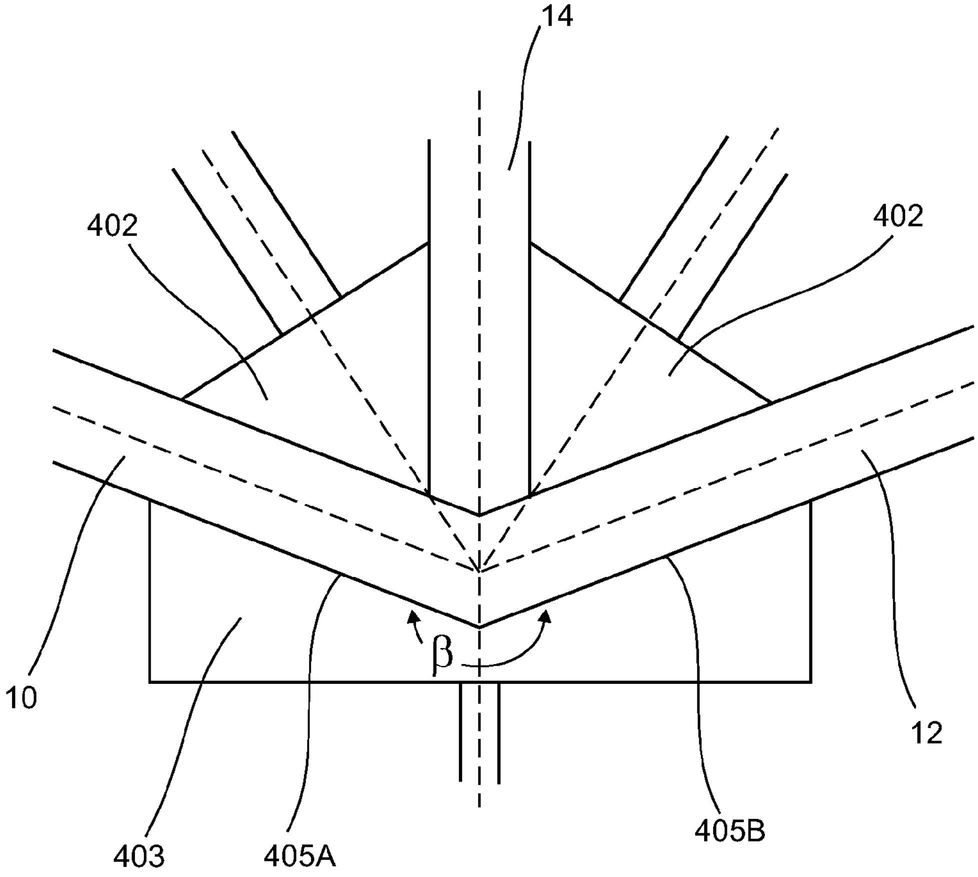
FIG. 6*d* is a simplified block diagram illustrating a bottom view of a clamping device according to yet another embodiment of the invention.

Optionally, jaw 303 is replaced by jaw 403 having two abutting surfaces 405A and 405B forming reflex angle β, as illustrated in FIG. 6*d*, for abutting the workpieces 10 and 12 while workpiece 14 is clamped thereto via jaws 402.

Figure 6E:
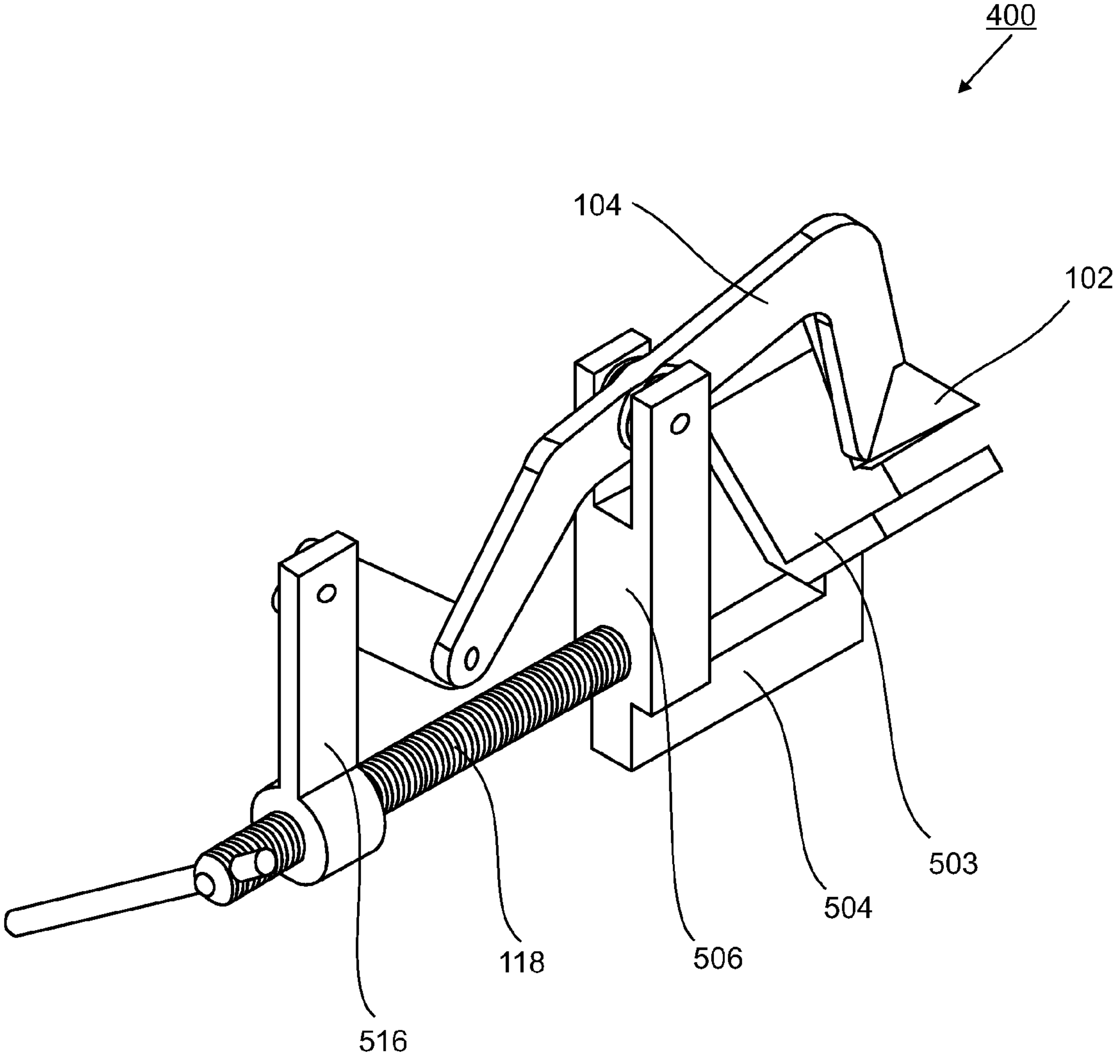
FIG. 6*e* is a simplified block diagram illustrating a perspective view of a clamping device according to yet another embodiment of the invention.

Referring to FIG. 6*e*, a clamping device 400 according to another embodiment of the invention is provided. The clamping device 400 comprises jaw 503 fixedly connected to holding element 506 via arm 504 and a single movable jaw 102 movable mounted to the holding element 506 via arm 104. The actuator comprises similar components as disclosed hereinabove with the actuator element 516 being adapted to actuate the single movable jaw 102. The jaw 503 forms a reflex angle suitable for joining workpieces forming a corner with the workpieces being oriented, for example, at an angle of 90° to each other. Optionally, the clamping device 400 comprises a mounting mechanism, for example, connected to the arm 504, for mounting the same to a workbench.

The present invention has been described herein with regard to certain embodiments. However, it will be obvious to persons skilled in the art that a number of variations and modifications can be made without departing from the scope of the invention as described herein.

What is claimed is:

1. A clamping device comprising:

at least three jaws for clamping a plurality of elongated workpieces with the workpieces forming predetermined angles therebetween, wherein each of at least two jaws comprises clamping surfaces oriented to correspond to a respective angle;

at least two arms, each arm having a respective jaw of the at least two jaws connected thereto at a first endportion thereof;

a holding element having the at least two arms pivotally movable mounted thereto such that the at least two jaws are movable between an open position for placing the clamping device and a clamping position for clamping the workpieces; and, an actuator connected to the at least two arms, the actuator for moving the at least two arms and for holding the at least two arms in the clamping position, wherein the actuator comprises:

an actuator element;

at least two coupling elements, each coupling element being pivotally movable mounted to the actuator element and pivotally movable mounted to the respective arm; and a screw mechanism for pivotally moving the at least two arms by changing a distance between the actuator element and the holding element; and, wherein each of the at least two arms is pivotally movable mounted at a midportion thereof and interacts with the actuator at a second endportion thereof.

2. A clamping device as defined in claim 1, wherein the at least two jaws are movable towards one center location.

3. A clamping device as defined in claim 2, wherein the center location substantially coincides with an intersection of centerlines of the workpieces in the clamping position.

4. A clamping device as defined in claim 2, wherein each of the at least two jaws is movable in a plane through a respective angle bisector.

5. A clamping device as defined in claim 1, wherein each of the at least three jaws is shaped to correspond to a respective angle.

6. A clamping device as defined in claim 5, wherein each of the at least three jaws is connected to a pivotally movable arm.

7. A clamping device as defined in claim 1, wherein each of the at least two jaws comprises two convex curved clamping surfaces oriented with respect to each other to correspond to the respective angle.

8. A clamping device as defined in claim 7, wherein each clamping surface is shaped such that the clamping surface interacts with a respective plane surface of the workpiece along a predetermined line for each position of a predetermined range of positions of the respective jaw, the range of positions being associated with a range of widths of the workpiece.

9. A clamping device as defined in claim 7, wherein at least a jaw comprises a jaw extension to account for a difference in width of the workpieces to be clamped.

10. A clamping device as defined in claim 1, wherein one of the at least three jaws is fixedly connected to the holding element.

11. A clamping device as defined in claim 1, wherein each of the at least two jaws is removable mounted to the respective arm.

12. A clamping device comprising:

at least three jaws for clamping a plurality of workpieces with the workpieces forming predetermined angles therebetween, wherein each of the at least three jaws comprises two clamping surfaces oriented to correspond to a respective angle;

at least three arms, each arm having a respective jaw of the at least three jaws connected thereto at a first endportion thereof;

a holding element having the at least three arms pivotally movable mounted thereto such that the at least three jaws are movable between an open position for placing the clamping device and a clamping position for clamping the workpieces; and, an actuator connected to the at least three arms, the actuator for moving the at least three arms and for holding the at least three arms in the clamping position, wherein the actuator comprises:

an actuator element;

at least three coupling elements, each coupling element being pivotally movable mounted to the actuator element and pivotally movable mounted to a second endportion of the respective arm; and, a screw mechanism for pivotally moving the at least three arms by changing a distance between the actuator element and the holding element.

13. A clamping device as defined in claim 12, wherein the at least three jaws are movable towards one center location.

14. A clamping device as defined in claim 13, wherein each of the at least three jaws comprises two convex curved clamping surfaces oriented with respect to each other to correspond to the respective angle with each clamping surface being shaped such that the clamping surface interacts with a respective plane surface of the workpiece along a predetermined line for each position of a predetermined range of positions of the respective jaw, the range of positions being associated with a range of widths of the workpiece.

15. A clamping device comprising:

two jaws for clamping two elongated workpieces with the workpieces forming a predetermined angle therebetween, wherein each of the two jaws comprises clamping surfaces oriented to correspond to respective surfaces of the workpieces;

two arms, each arm having a respective jaw connected thereto at a first endportion thereof;

a holding element having a first arm of the two arms pivotally movable mounted thereto such that the respective jaw is movable between an open position for placing the clamping device and a clamping position for clamping the workpieces; and, an actuator connected to the first arm, the actuator for moving the first arm and for holding the first arm in the clamping position, wherein the actuator comprises:

an actuator element;

at least a coupling element, the coupling element being pivotally movable mounted to the actuator element and pivotally movable mounted to a second endportion of the first arm; and, a screw mechanism for pivotally moving the first arm by changing a distance between the actuator element and the holding element.

16. A clamping device comprising:

at least three jaws for clamping a plurality of elongated workpieces with the workpieces forming predetermined angles therebetween, wherein each of at least two jaws comprises clamping surfaces oriented to correspond to a respective angle;

at least two arms, each arm having a respective jaw of the at least two jaws connected thereto at a first endportion thereof, wherein each of the at least two jaws is removable mounted to the respective arm;

a holding element having the at least two arms pivotally movable mounted thereto such that the at least two jaws are movable between an open position for placing the clamping device and a clamping position for clamping the workpieces;

an actuator connected to the at least two arms, the actuator for moving the at least two arms and for holding the at least two arms in the clamping position; wherein the actuator comprises: an actuator element; at least a coupling element, the coupling element being pivotally movable mounted to the actuator element and pivotally movable mounted to a second endportion of the first arm; and, a screw mechanism for pivotally moving the first arm by changing a distance between the actuator element and the holding element.

* * * * *